United States Patent [19]
Gurusami et al.

[11] Patent Number: 5,557,319
[45] Date of Patent: Sep. 17, 1996

[54] SUBSCRIBER RETURN SYSTEM FOR CATV FULL SERVICE NETWORKS

[75] Inventors: Aravanan Gurusami, East Syracuse; Mark Chapman, Bridgeport; John G. Staiger, Clay, all of N.Y.

[73] Assignee: U.S. Philips Corporation, New York, N.Y.

[21] Appl. No.: 366,341

[22] Filed: Dec. 28, 1994

[51] Int. Cl.⁶ .................................................. H04N 7/173
[52] U.S. Cl. ............................. 348/11; 348/12; 348/6
[58] Field of Search .................................. 348/11, 6, 10, 348/8, 12, 13; 455/3.1, 4.1, 4.2, 5.1, 6.1, 6.2; H04N 7/173

[56] References Cited

U.S. PATENT DOCUMENTS

| Re. 31,639 | 7/1984 | Nicholson | 348/12 |
| 5,126,840 | 6/1992 | Dufresne et al. | 348/6 |

FOREIGN PATENT DOCUMENTS

| 161937 | 9/1984 | Japan | 358/86 |
| 36283 | 2/1989 | Japan | H04N 7/173 |
| 207689 | 8/1990 | Japan | H04N 7/173 |
| 6981 | 1/1991 | Japan | H04N 7/173 |
| 5268605 | 10/1993 | Japan | H04N 7/173 |

*Primary Examiner*—Safet Metjahic
*Assistant Examiner*—Chris Grant
*Attorney, Agent, or Firm*—Michael J. Balconi-Lamica; David R. Treacy

[57] ABSTRACT

A subscriber premise local bus (SPLB) is connected to a cable drop from a wide-band 2-way network through a gateway device providing frequency conversion and blocking of certain frequencies used in the subscriber premises local bus (SPLB). Service channels to the consumer are provided in a first band such as 54 to 750 MHZ, carried unchanged over the SPLB. Return signals from the subscriber are generated at subscriber devices, such as TV, computers, etc. at, or are up-converted to, signals in a higher frequency band, such as 900 to 950 Mhz, for transmission on the SPLB to the gateway device where they are down-converted to frequencies below 54 Mhz for transmission over the network. A band-pass or other filter may block at least some of the lower frequencies from carrying over from the SPLB to the cable drop or 2-way network.

18 Claims, 2 Drawing Sheets

SUBSCRIBER RETURN SYSTEM FOR CATV FULL SERVICE NETWORKS

BACKGROUND OF THE INVENTION

1. Field of the Invention

The invention relates to cable tv networks (CATV), and more particularly to apparatus for transmitting return communications in a two-way system.

Common one-way CATV systems have the disadvantage that they are not interactive. The customer's only options are to select one of the channels which are available on the service drop cable, or to place a telephone call to a control center to enable or alter a service; for example, to enable a pay-per-view channel.

Although they are not yet widely available, Full Service Networks (FSN) are proposed which provide a much higher bandwidth for information channels from the network node, and also allow return information over one or more channels having a much greater bandwidth than is possible over a standard telephone connection.

2. Description of the Prior Art

CATV systems commonly use coaxial cable to provide a plurality of services over different carrier frequencies to the subscriber's premises. Although early CATV systems carried only a relatively small number of channels, it is now common that up to 80 or even more channels are provided. FSN carrier frequencies for the service transmissions to a subscriber multimedia device may range typically in a band from 54 to 750 Mhz.

One-way CATV systems customarily use coaxial cable for distribution of service signals within a subscriber's premises. However, some FSN systems will offer telephone service over the same CATV service drop from the tap (usually in the street) to the premises entry point. To minimize costs, it is desirable that these and other services utilize existing wiring within the house or office wherever possible. Therefore some of the wiring which is functionally part of a subscriber premises local bus (referred to hereinafter in the specification and claims as SPLB because it is connected, directly or indirectly, to the entry point, will be unshielded twisted pair, which is susceptible to picking up electromagnetic noise or signals at RF frequencies from other devices on the premises.

Wherever two-way systems are currently provided, the return systems typically operate in an RF band of 5 to 42 Mhz, with the carrier frequencies being generated in the various sets which are connected to the SPLB. These return transmissions are then simply passed through any protective interconnect device between the SPLB and the cable drop, and then along the drop and the cable on the street.

Two-way systems as described above offer the possibility of maximizing band usage on the transmission cable between the head end or transmission node and the user site, such as the line tap adjacent the user's building. However, the quality of transmission is sometimes degraded by impulse noise funneling into the system via the SPLB. Such noise often is due to CB transmitters, ham radios, or other electrical noise originating in residences and industrial sites. These noise sources tend to be particularly strong at the lower frequencies used for return transmissions.

SUMMARY OF THE INVENTION

An object of the invention is to provide improved signal-to-noise ratios for the return transmissions of a two-way Full Service Network, without requiring rewiring of residences or offices.

Another object of the invention is to improve signal-to-noise ratios for the return transmissions without requiring design or manufacturing of complex new circuits or equipment.

According to the invention, these objects are achieved by transmitting return transmission signals from the subscriber devices over the SPLB to the cable entry point of the residence or building at frequencies in a band higher than the band used for the service channels, such as television or multi-media signals, being provided from the head end. At the entry point the signals in the higher band are converted in a gateway device to a band lower than the service channels, such as the 5 to 42 Mhz portion of the 5 to 54 MHz band now available for return transmission over the existing coaxial or optical links.

To minimize the expense of design and manufacture of equipment for a new frequency band, the transmission from the subscriber device to the entry point is advantageously sent over the 905 to 942 Mhz portion of the 900 to 950 MHz bands for which modulators and amplifiers are now readily available.

A particular feature of the invention is the use of filtering in the gateway device to block at least some signals on the SPLB in the band, such as 5 to 54 MHZ, from being transmitted from the SPLB to the entry point. However, if it is desired to continue use of existing devices, such as set top converters, which now transmit return communications such as impulse pay per view requests at frequencies within that band, for example frequencies below 11 Mhz, then for such systems the gateway filter should not block those frequencies.

DESCRIPTION OF THE PREFERRED EMBODIMENT

Figure 1:
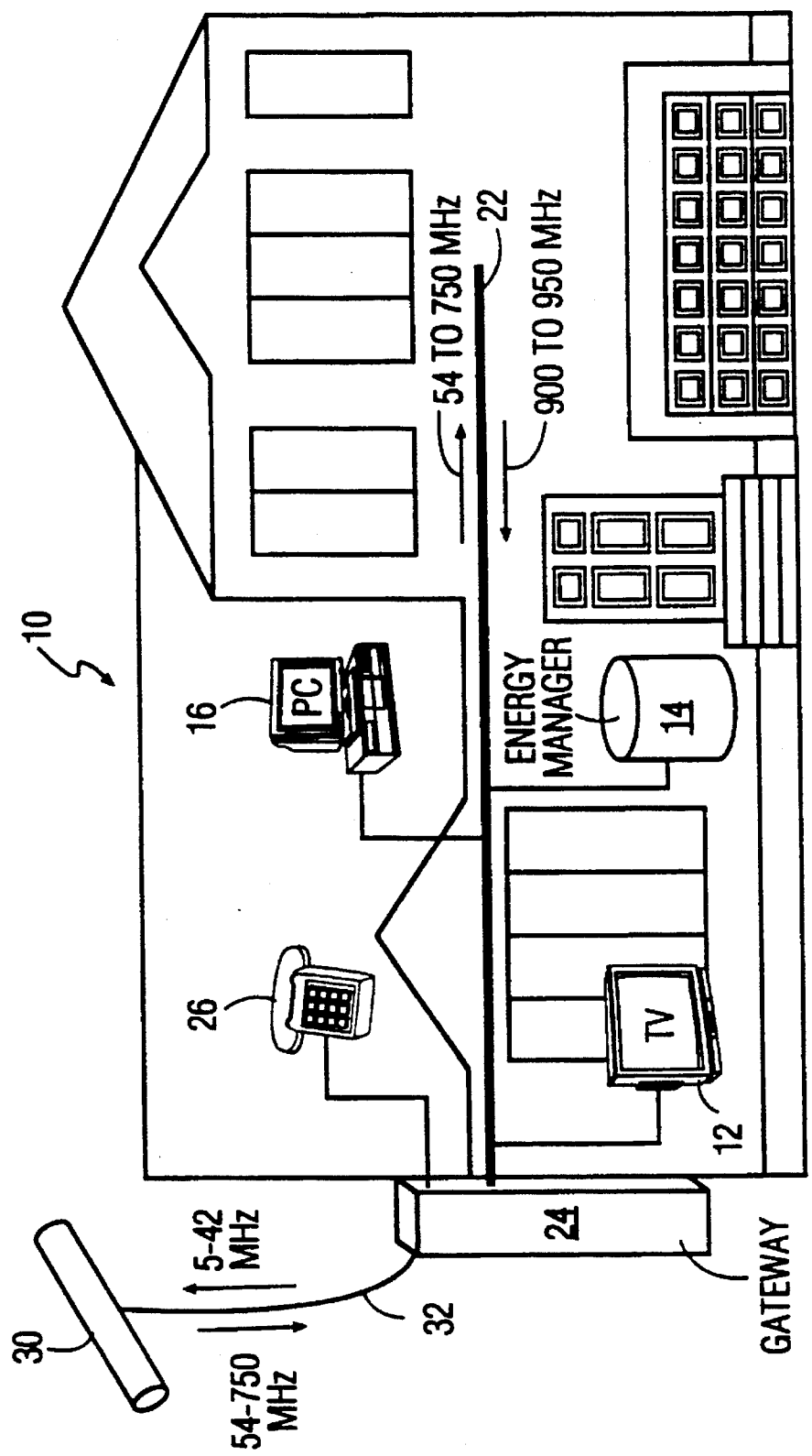
FIG. 1 is a diagrammatic view of a typical subscriber premise showing devices connected in accordance with the invention.

The typical FSN-connected single family residence 10 showed in FIG. 1 includes a video/audio center 12, an energy management arrangement 14, a computer 16 having a modem for communications to other computers or networks, and a telephone 18. The wide bandwidth devices, such as the video/audio center 12, energy management arrangement 14, and computer 16 are connected to an SPLB 22 which is formed by a coaxial cable in order to minimize signal losses, and terminates at an entry point of the house in a gateway device 24. In addition, a telephone 26 is connected to the gateway device by a twisted pair cable 28.

The residence 10 receives FSN service from a system having a head end or node (not shown), which provides signals transmitted over a cable 30, which is typically a coaxial cable, which passes by the residence 10 underground or on a pole. A tap on the cable 30 is connected to the gateway device 24 by a service drop cable 32.

The drop 32 and cable 30 carry service channels over a frequency band between 54 and 750 Mhz, and return transmissions over a frequency band between 5 and 42 Mhz.

In accordance with the invention, the video/audio center 12 includes control signal generators and modulators for producing control signals. The video/audio center 12 includes a standard set-top converter 34 for providing impulse pay per view signals at frequencies between 5 and 11 Mhz, and may also provide return signals for interactive communication at frequencies between 905 and 942 Mhz. The energy management arrangement 14 and computer 16 also contain respective signal generators and modulators producing return signals at frequencies falling within the 905 to 942 Mhz band.

Figure 2:
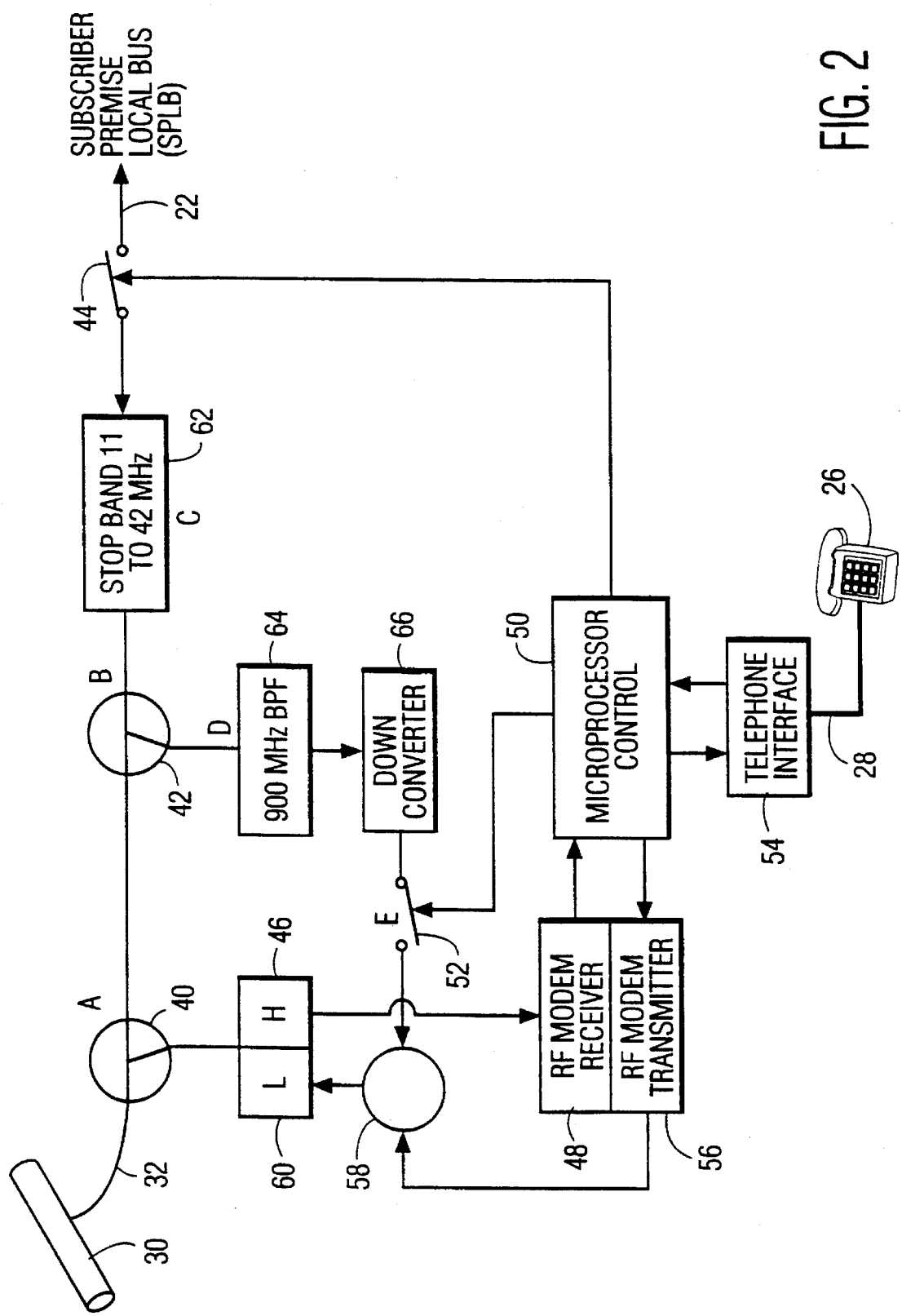
FIG. 2 is a diagram of a gateway device and connections to it.

The gateway device 24 is shown in FIG. 2, where reference numerals for similar elements have the same numbers as in FIG. 1. Wideband service channels are passed by directional couplers 40 and 42 through a connect/disconnect switch 44 to the SPLB 22 so that they can be received by any units connected to the SPLB. System operator control signals, at selected frequencies in the 50–750 Mhz band, are also passed by coupler 40 to a filter 46 whose output is connected as an input to an RF modem receiver 48. The output of the modem receiver 48 is provided to a microprocessor controller 50 having control outputs which control switch 44 and a switch 52. These switches enable the system operator to limit access of the subscriber for service channels (switch 44) or return transmissions (switch 52).

The microprocessor 50 also provides telephone signals to, and receives telephone signals from, an interface 54 to which the twisted wire pair 28 is connected. Use of the microprocessor 50 and interface 54 optionally enable system operator control over use of the telephone 26. Telephone signals being transmitted pass through the interface 54 and the microprocessor 50 to a modem transmitter 56, whose output is supplied to a summer 58, whose output in turn is input to a lowband filter. The lowband filter 60 provides signals with frequencies between 5 and 42 Mhz to the directional tap 40, which allows these signals to pass to the cable drop 32, thus enabling return transmissions to the cable system node or head end.

If the system operator has enabled wide-band service to the subscriber, return signals between 905 and 942 Mhz will be generated by the video/audio center 12, energy management arrangement 14, and computer 16, coupled to the SPLB, and passed through the switch 44 and a stop band filter 62 to directional coupler 42. The coupler then inputs these signals at frequencies above the service channels to a 900 Mhz band pass filter 64 whose output is the input of a block down converter 66. The down converter shifts the return signals down to the 5 to 42 Mhz band. If the system operator has enabled broad band return transmission from the subscriber, the down-converted signals pass through switch 52 to the summer 58, then the low band filter 60, and through the directional coupler 40 to the drop cable 32 and system cable 30.

Set top converter signals below 11 Mhz are also passed by the stop band filter 62. They pass directly through directional coupler 42 and coupler 40 to the drop 32.

From the above description, it is clear that the invention provides a low cost yet versatile gateway. Local noise signals in the 5 to 42 Mhz band, picked up by the telephone 26 or its wiring 28, are effectively blocked from the cable drop by the interface 54 and microprocessor 50. Noise signals between 11 and 42 Mhz, picked by SPLB 22 or devices connected to the SPLB are blocked by the stop band filter 62. If set top converter signals below 11 Mhz are not utilized, then the stop band filter 62 may be selected to block the 5 to 42 Mhz band.

While the gateway device has been described as being at the entry point between a cable drop and the subscriber premises, it will be clear that it could also be incorporated at the location of the tap on the pole or underground cable serving the street or area; or, in a large building or complex, could be located within that building or complex.

Selection of the 905–942 MHz band for transmission over the SPLB takes advantage of availability of devices designed and manufactured for this band for other purposes. It will be clear that the different frequencies mentioned herein are convenient for use at the time the invention was made, but the invention is not limited in any way to these frequencies, bands, or bandwidths.

What is claimed is:

1. A system for connecting at least one subscriber device to an off-premises broad band transmission system for two-way communication, comprising:

means for providing service channels from the off-premises broad band transmission system to an entry point over a plurality of carrier frequencies in a first band, and for carrying return transmissions from the entry point over at least one carrier frequency in a second band of frequencies lower than the first band, and a subscriber premises local bus (SPLB) connected to the entry point for carrying the service channels to the at least one subscriber device over the carrier frequencies in the first band, characterized in that the system further comprises:

means for providing a return transmission signal from the at least one subscriber device to the bus at at least one carrier frequency in a third band of frequencies higher than the first band, and for coupling the signal in the third band to the subscriber premises local bus, and the entry point comprises means for converting the return signal from the subscriber premises local bus in the third band to a return signal in the second band, the return signal in the second band being one of the return transmissions.

2. A system as claimed in claim 1, characterized in that the entry point further comprises a band pass filter connected between the SPLB and the means for converting.

3. A system as claimed in claim 1, characterized in that the means for converting comprises a block frequency down converter.

4. A system as claimed in claim 3, characterized in that the entry point further comprises a band pass filter connected between the SPLB and the block frequency down converter.

5. A system as claimed in claim 1, characterized in that the entry point further comprises a connect/disconnect switch between the means for converting and the means for carrying the return transmissions, and the system further comprises means for remote control of the connect/disconnect switch by the system operator.

6. A system as claimed in claim 1, characterized in that the second band is below approximately 54 Mhz, and the third band is above approximately 900 Mhz.

7. A system as claimed in claim 6, characterized in that the third band lies between approximately 905 and 942 Mhz.

8. A system as claimed in claim 1, characterized in that said first band of frequencies has a width greater than the width of the third band.

9. A system as claimed in claim 8, characterized in that said second band of frequencies has a width equal to the width of the third band.

10. A system as claimed in claim 1, characterized in that said second band of frequencies has a width equal to the width of the third band.

11. A system for connecting at least one subscriber device to an off-premises broad band transmission system for two-way communication, comprising:

means for providing service channels from the off-premises broad band transmission system to an entry point over a plurality of carrier frequencies in a first band, and for carrying return transmissions from the entry point over at least one carrier frequency in a second band of frequencies lower than the first band, and a subscriber premises local bus (SPLB) connected to the entry point for carrying the service channels to the at least one subscriber device over the carrier frequencies in the first band, characterized in that the system further comprises:

means for providing a return transmission signal from the at least one subscriber device to the bus at at least one carrier frequency in a third band of frequencies higher than the first band, and for coupling the signal in the third band to the subscriber premises local bus, and the entry point comprises means for converting the return signal from the subscriber premises local bus in the third band to a return signal in the second band, the return signal in the second band being one of the return transmissions, and a stop band device for blocking signals on the SPLB at least one frequency in said second band from being transmitted to the means for carrying.

12. A system as claimed in claim 11, characterized in that the stop band device blocks a first sub-band of frequencies within the second band, and passes a second subband of frequencies with the second band.

13. A system as claimed in claim 12, characterized in that the second subband includes frequencies below 11 Mhz.

14. A system as claimed in claim 11, characterized in that the means for converting comprises a block frequency down converter.

15. A system as claimed in claim 14, characterized in that the entry point further comprises a band pass filter connected between the SPLB and the block frequency down converter.

16. A system as claimed in claim 11, characterized in that the system comprises a further subscriber device connected to the entry point by twisted pair cabling.

17. A system as claimed in claim 11, characterized in that the entry point is formed by a gateway device including a microprocessor and at least one switch for connecting and disconnecting transmission paths through the gateway for selected bands of frequencies, said microprocessor being responsive to system operator commands.

18. A system as claimed in claim 17, characterized in that the system comprises a further subscriber device connected to the gateway device by twisted pair cabling.

* * * * *